United States Patent
Teng et al.

(10) Patent No.: US 7,254,317 B2
(45) Date of Patent: Aug. 7, 2007

(54) METHOD AND APPARATUS FOR RECORDING DIGITAL IMAGE DATA TO OPTICAL DISKS

(75) Inventors: Chih-Wei Teng, Taipei (TW); Chih-Chiang Shen, Ilan (TW); Shih-Chien Pan, Taipei (TW); Jiun-Shiung Chen, Ilan (TW)

(73) Assignee: Lite-On IT Corporation, Taipei (TW)

( * ) Notice: Subject to any disclaimer, the term of this patent is extended or adjusted under 35 U.S.C. 154(b) by 900 days.

(21) Appl. No.: 10/662,614

(22) Filed: Sep. 15, 2003

(65) Prior Publication Data

US 2004/0096197 A1    May 20, 2004

(30) Foreign Application Priority Data

Nov. 14, 2002   (TW) ............................... 91133427 A

(51) Int. Cl.
  *H04N 5/76*   (2006.01)
  *H04N 7/26*   (2006.01)
  *H04N 5/00*   (2006.01)

(52) U.S. Cl. .................. 386/111; 386/125; 386/126

(58) Field of Classification Search ............. 386/124, 386/125, 45, 117, 107, 120, 121
See application file for complete search history.

(56) References Cited

U.S. PATENT DOCUMENTS

| | | | |
|---|---|---|---|
| 6,738,075 B1 * | 5/2004 | Torres et al. | 715/723 |
| 6,807,367 B1 * | 10/2004 | Durlach | 386/125 |
| 2002/0118949 A1 * | 8/2002 | Jones et al. | 386/68 |
| 2003/0206729 A1 * | 11/2003 | Loui et al. | 386/125 |

* cited by examiner

*Primary Examiner*—Thai Tran
*Assistant Examiner*—Gelek Topgyal
(74) *Attorney, Agent, or Firm*—Thomas, Kayden, Horstemeyer & Risley

(57) ABSTRACT

A method of recording image files to CD. The real-time method of recording digital image files to CD establishes ISO file parameters of a waiting recordable CD, and determines the files' recording location accordingly, with no need for additional hard drive or computer support.

13 Claims, 3 Drawing Sheets

METHOD AND APPARATUS FOR RECORDING DIGITAL IMAGE DATA TO OPTICAL DISKS

BACKGROUND OF THE INVENTION

1. Field of the Invention

The present invention relates to a method and apparatus for recording, and in particular to a method and apparatus for recording digital image data to optical disks.

2. Description of the Related Art

With the progress of the Internet and digital image input hardware, more users are utilizing multimedia web pages, thereby causing the rapid development of editing and recording of digital image data, such as JPEG and GIF files. Conventionally, users transfer imagines that obtained from scanner to files, and store them on hard disk. Generally speaking, the size of a digital image file ranges from hundreds of KB to MB (depending on resolution), such that plurality of digital photos are difficult to access by floppy disk or transmit through the internet. Users normally save digital image files on the hard disk and write the image files to an optical disk for backup or viewing.

Recently, digital cameras and digital video recorders are more popular than before, and the capacity of non-volatile memory cards (such as CF card, Smart Media card) and portable drives are significantly increased. Digital photos stored directly to non-volatile memory cards are considerably more popular. There are, however, various formats of non-volatile memory cards. Thus, although there exists disk readers for the different formats, the most popular and convenient data storage medium is the optical disk.

Currently, videoCD players support VCD 2.0 specifications, allowing video and static graphics to be viewed at high resolutions (704×480 Full color) Also, because prices of non-volatile memory cards are still high, users must conserve occupied capacity in digital devices by deleting photos or uploading photos frequently. If a computer is not available, users must delete photos to conserve occupied memory capacity, presenting inconvenience and possible loss of desired data.

SUMMARY OF THE INVENTION

Accordingly, an object of the invention is to provide a method for recording digital image data to an optical disk. The method requires no hard disk, and can record the digital image data to the optical disk in real time.

Another object of the invention is to provide an apparatus for recording digital image data to an optical disk. The apparatus is standalone, and provides real-time recording of digital image files to the optical disk without computer or hard disk.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
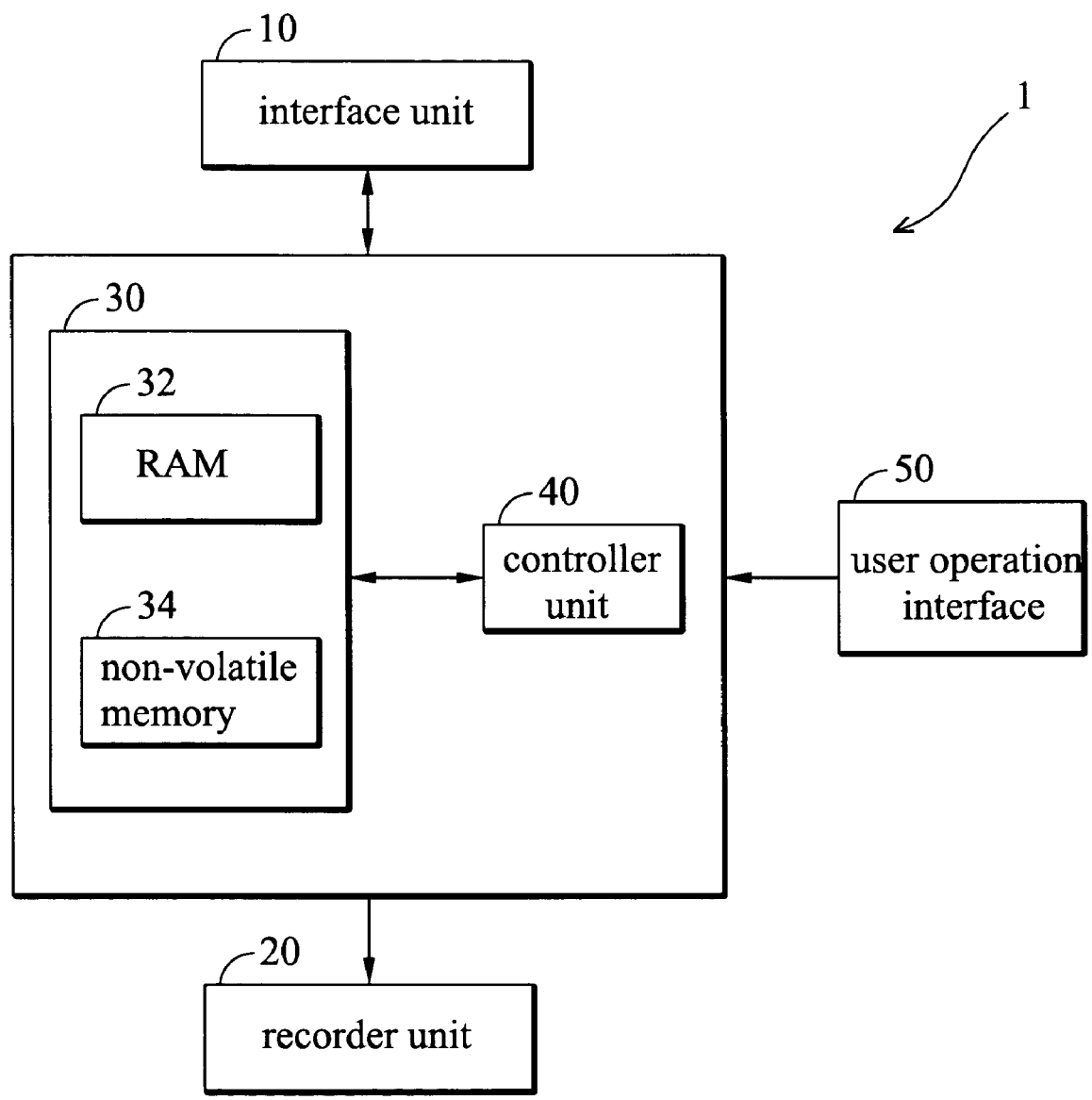
FIG. 1 is a block diagram of apparatus for recording digital image data to an optical disk according to the present invention.

FIG. 1 is a block diagram of an apparatus for recording digital image data to an optical disk according to the present invention. The apparatus 1 comprises an interface unit 10, a recording unit 20, a memory unit 30, a controller unit 40, and a user interface 50. The apparatus 1 utilizes the interface unit 10 to read digital image files of a non-volatile memory card (not illustrated). The recording unit 20 is functionally similar to a standard CD-RW drives, but is not controlled by a host computer. The recording unit 20 is controlled by the control unit 40 to execute real-time and specific format recording. The memory unit 30 may include a RAM portion 32 and a non-volatile memory portion 34. The RAM portion 32 temporarily stores recording programs and files, and the non-volatile memory portion 34 stores a specific recording program (details described subsequently). The controller unit 40, such as a microprocessor, executes specific and real-time recording operations according to the specific recording program stored in the non-volatile memory portion 34. The user interface 50, for example, can be a record command key. Users can record digital image files of the non-volatile memory card by executing the record command after the non-volatile memory card is connected to the apparatus 1 by the interface unit 10.

Figure 2:
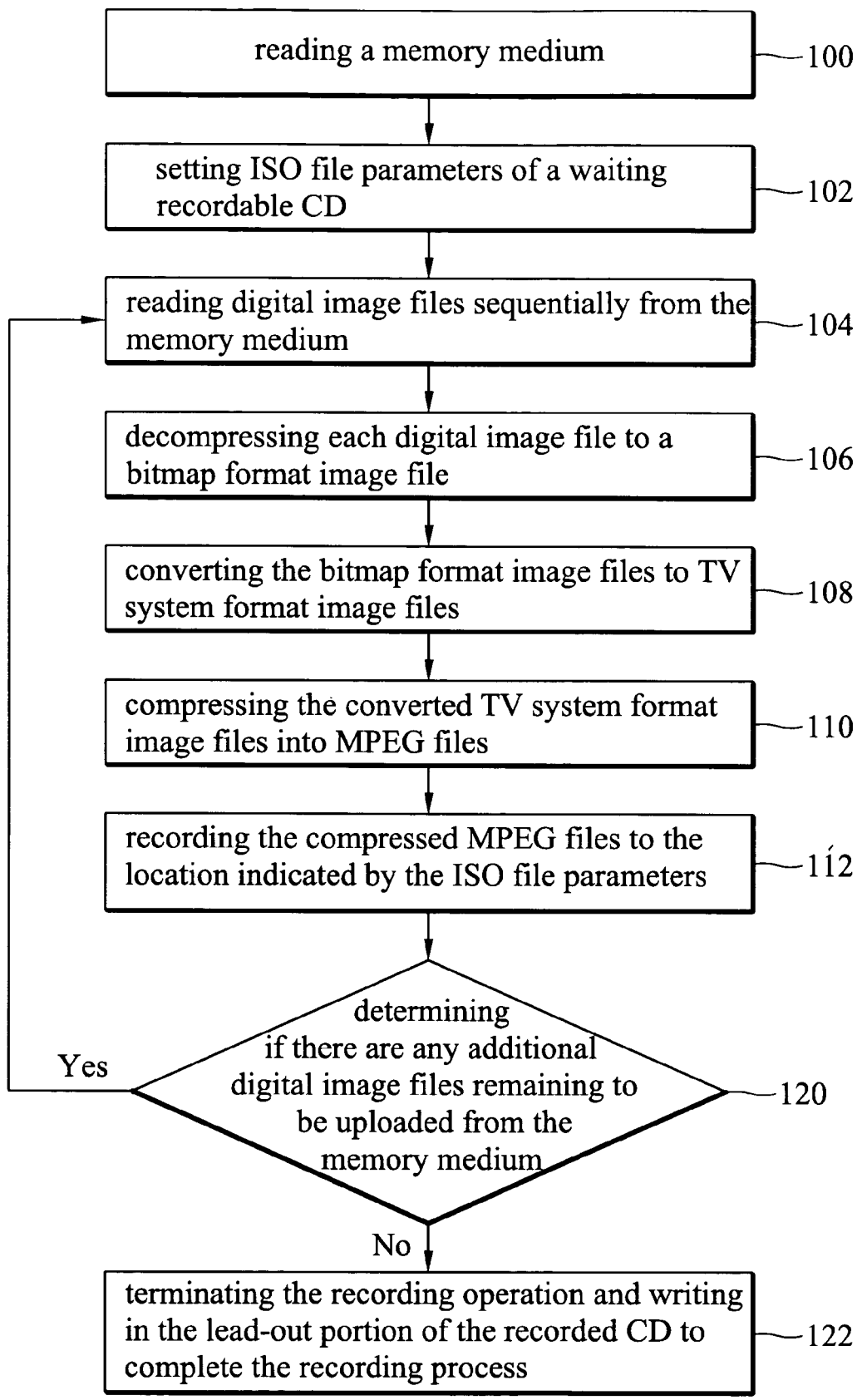
FIG. 2 is a flowchart of the method of recording digital image data to the optical disk of the present invention.

FIG. 2 shows the processing steps of the specific recording operation.

In step S100, the interface unit 10 reads a memory medium, and the image files are temporarily stored in the RAM portion 32. The memory medium can be a portable non-volatile memory card, such as CF card, Smart Media card, thumbnail drive, or an optical disk. Processing then proceeds to step S102.

In step S102, the ISO file parameters of a recordable optical disk are set. Because video CDs comply with the ISO 9660 MODE 2 file system, the first track stores an ISO content list, static graphics, interactive CD applications and Help documents, and the other tracks store MPEG files. The method according to the present invention takes place in real time and is standalone (requiring no hard disk), thus the number and format of image files can be directly read to establish the ISO content list. For instance, ISO 9660 MODE 2 possesses fixed static image file formats (details described subsequently), and the ISO file parameters can be established beforehand in accordance with the fixed file formats. Processing then proceeds to step S104.

In step S104, the recording programs stored in the non-volatile memory portion 34 sequentially read all of the digital image files that temporarily stored in the RAM portion 32. The digital image files are read from the memory medium in step S102. Processing then proceeds to step S106.

In step S106, all of digital image files stored in the RAM portion 32 are sequentially decompressed into bitmap format image files to comply with the ISO 9660 MODE 2 format standard from the existing compressed image file format (JPEG, GIF). Processing then proceeds to step S108.

In step S108, the bitmap format image files are converted to TV system format image files. Because ISO 9660 MODE 2 supports image resolutions up to 704×480 (NTSC), 704×576 (PAL), and 352×240 (NTSC), 352×288 (PAL) in low resolution mode, in step S108, it is necessary to convert bitmap format into the specific format supported by ISO 9660 MODE 2. Processing then proceeds to step S110.

In step S110, the converted TV system format image files are compressed into MPEG files for subsequent recording process. Processing then proceeds to step S112.

In step S112, the compressed MPEG files are recorded to the location indicated by the ISO file parameters. Because the number and format of image files have been set previously in step S102, all of the image files can be recorded to the optical disk according to the set result in this step. Thus, all compressed MPEG files stored in the RAM portion 32 are recorded to the optical disk by the recording unit 20. Besides, the recording unit 20 is equipped with SMART-BURN technologies (or BURN Proof, Just Link etc) to avoid write failure due to BURN problem. The aforementioned technology such as SMART-BURN must be activated when recording image files to the optical disk. Processing then proceeds to step S120.

In Step S120, the control unit 40 is used to determine whether any digital image files are left in the memory medium. If yes, then processing returns to step S104. If no, then processing proceeds to step S122.

Finally, in step S122, the recording operation is completed and the lead out portion of the recordable optical disk is written to complete the video CD recording process.

Figure 3:
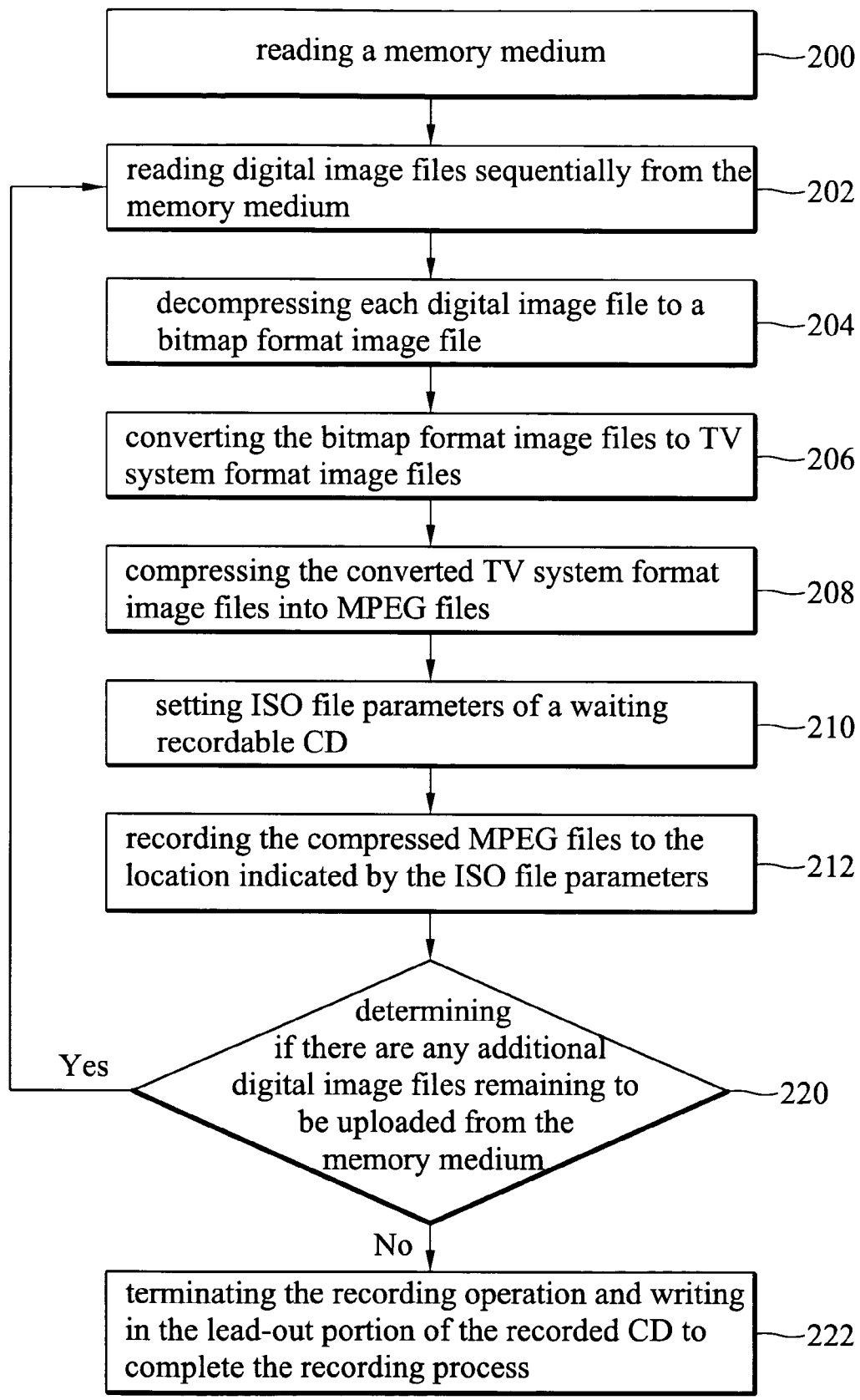
FIG. 3 is a flowchart of another embodiment of the method of recording digital image data to the optical disk according to the present invention.

FIG. 3 is a flowchart of another embodiment of the method of recording digital image data to the optical disk according to the present invention.

In step S200, the interface unit 10 reads a memory medium, and one image file is temporarily stored in the RAM portion 32. The memory medium can be a portable non-volatile memory card, such as CF card, Smart Media card, thumbnail drive or an optical disk. Processing then proceeds to step S202.

In step S202, the recording program stored in the non-volatile memory portion 34 reads the image file stored in RAM portion 32. Processing then proceeds to step S204.

In step S204, the digital image file stored in the RAM portion 32 is decompressed into bitmap format image files to comply with the ISO 9660 MODE 2 format standard from the existing compressed image file format (JPEG, GIF). Processing then proceeds to step S206.

In step S206, the bitmap format image file is converted to TV system format image file. Because ISO 9660 MODE 2 supports image resolution up to 704×480 (NTSC), 704×576 (PAL), and 352×240 (NTSC), 352×288 (PAL) in low resolution mode, in step S108, it is necessary to convert bitmap format into the specific format supported by ISO 9660 MODE 2. Processing then proceeds to step S208.

In step S208, the converted TV system format image file is compressed into MPEG file for subsequent recording process. Processing then proceeds to step S210.

In step S210, the ISO file parameters of a recordable optical disk are set. Because video CDs comply with the ISO 9660 MODE 2 file system, the first track stores an ISO content list, static graphics, interactive CD applications and Help documents, and the other tracks store MPEG files. The method according to the present invention takes place in real time and is standalone (requiring no hard disk), thus the format of the image file can be directly read to establish the ISO content list. For instance, ISO 9660 MODE 2 possesses fixed static image file formats, and the ISO file parameters can be established beforehand in accordance with the fixed file formats. Processing then proceeds to step S212.

In step S212, the compressed MPEG file is recorded to the location indicated by the ISO file parameters. Because format of the image file has been set previously in step S210, the image file can be recorded to optical disks according to the set result in this step. Thus, compressed MPEG file stored in the RAM portion 32 is recorded to the optical disk by the recording unit 20. Besides, the recording unit 20 is equipped with SMART-BURN technologies (or BURN Proof, Just Link etc) to avoid write failure due to BURN problem. The aforementioned technology such as SMART-BURN must be activated when recording image files to the optical disk. Processing then proceeds to step S220.

In Step S220, the control unit 40 is used to determine whether any digital image files are left in the recording medium. If yes, then processing returns to step S202. If no, then processing proceeds to step S222.

Finally, in step S222, the recording operation is completed and the lead out portion of the recordable optical disk is written to complete the video CD recording process.

The processing steps of the embodiment are similar to steps of FIG. 2. Obviously, the difference is that, in the latter embodiment, the video CD content list is produced after compressing the converted TV system format image file into MPEG file, thus the assignment of ISO file parameters is more accurate.

Thus, the invention discloses a method and apparatus for recording image data to the optical disks. The apparatus operates without host computer or a hard disk. Users record digital image files from non-volatile memory cards in real time by executing the record command after connecting the non-volatile memory cards to the apparatus. Practically, the standalone apparatus can be established in public areas, such that digital camera users can back up photos and free storage space at their convenience without a computer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for recording image files to optical disks, comprising:
   a. reading a memory medium;
   b. setting ISO file parameters of a waiting recordable CD;
   c. reading digital image files sequentially from the memory medium;
   d. decompressing each digital image file to a bitmap format image file;
   e. converting the bitmap format image files to TV system format image files;
   f. compressing the converted TV system format image files into MPEG files;
   g. recording the compressed MPEG files to the location indicated by the ISO file parameters;
   h. determining whether any digital image files are left in the memory medium, and if yes, returning to Step c, and, if not, continuing to step i;
   i. terminating the recording operation and writing in the lead-out portion of the recorded optical disk to complete the recording process.

2. The method as claimed in claim 1, wherein the memory medium is a portable non-volatile memory device, such as CompactFlash (CF), Smart Media (SM), Memory Stick (MS), MultiMedia Card (MMC), Secure Digital (SD), xD card or portable drive.

3. The method as claimed in claim 1, wherein the memory medium is an optical disk.

4. The method as claimed in claim 1, wherein the digital image files are JPG or GIF compressed files.

5. The method as claimed in claim 1, wherein the TV system complies with the NTSC standard.

6. The method as claimed in claim 1, wherein the bitmap format is converted to 704×480 pixel resolution.

7. The method as claimed in claim 1, wherein the bitmap format is converted to 352×240 pixel resolution.

8. The method as claimed in claim 1, wherein the TV system complies with the PAL standard.

9. The method as claimed in claim 1, wherein the bitmap format is converted to 704×576 pixel resolution.

10. The method as claimed in claim 1, wherein the bitmap format is converted to 352×288 pixel resolution.

11. The method as claimed in claim 1, wherein the setting of ISO file parameters is enabled by a number of most suitable events induced by ISO 9660 MODE 2.

12. The method as claimed in claim 1, wherein recording is enabled by buffer under-run.

13. The method as claimed in claim 1, wherein the setting of ISO file parameters for the optical disk is executed after compressing bitmap files to MPEG files.

\* \* \* \* \*